(12) United States Patent
Belluomini et al.

(10) Patent No.: US 8,706,962 B2
(45) Date of Patent: Apr. 22, 2014

(54) MULTI-TIER STORAGE SYSTEM CONFIGURATION ADVISER

(75) Inventors: Wendy A. Belluomini, San Jose, CA (US); Joseph S. Glider, Palo Alto, CA (US); Jorge Guerra Delgado, Miami, FL (US); Himabindu Pucha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/360,494

(22) Filed: Jan. 27, 2012

(65) Prior Publication Data

US 2013/0198449 A1 Aug. 1, 2013

(51) Int. Cl.
*G06F 12/00* (2006.01)

(52) U.S. Cl.
USPC ........... 711/117; 711/114; 711/154; 711/158; 711/170

(58) Field of Classification Search
USPC .......................... 711/117, 114, 154, 158, 170
See application file for complete search history.

(56) References Cited

U.S. PATENT DOCUMENTS

| | | | | |
|---|---|---|---|---|
| 7,434,017 | B2 * | 10/2008 | Maruyama et al. | 711/165 |
| 7,565,487 | B2 * | 7/2009 | Taguchi et al. | 711/114 |
| 7,689,801 | B2 | 3/2010 | Logan et al. | |
| 7,694,102 | B2 | 4/2010 | Garcia-Arellano et al. | |
| 8,051,243 | B2 * | 11/2011 | Murase | 711/114 |
| 8,117,235 | B1 * | 2/2012 | Barta | 707/802 |
| 8,171,216 | B2 * | 5/2012 | Dawkins | 711/114 |
| 8,284,627 | B2 * | 10/2012 | Belluomini et al. | 365/226 |
| 8,452,941 | B2 * | 5/2013 | Dawkins et al. | 711/206 |
| 8,504,771 | B2 * | 8/2013 | Dawkins | 711/114 |
| 2003/0078996 | A1 * | 4/2003 | Baldwin | 709/220 |
| 2009/0327618 | A1 | 12/2009 | Pollack et al. | |
| 2010/0191906 | A1 | 7/2010 | Beniyama et al. | |
| 2010/0281230 | A1 | 11/2010 | Rabii et al. | |
| 2011/0010514 | A1 * | 1/2011 | Benhase et al. | 711/162 |
| 2011/0071952 | A1 * | 3/2011 | Gaffney et al. | 705/317 |
| 2011/0197027 | A1 * | 8/2011 | Balasubramanian et al. | 711/117 |
| 2011/0314069 | A1 * | 12/2011 | Alatorre et al. | 707/827 |
| 2012/0005435 | A1 * | 1/2012 | Emaru et al. | 711/154 |
| 2012/0023292 | A1 * | 1/2012 | Saito et al. | 711/114 |

(Continued)

OTHER PUBLICATIONS

S. Gopisetty et al., "Automated planners for storage provisioning and disaster recovery", IBM Journal of Research and Development, Apr. 2008, vol. 52, No. 4-5, pp. 1-13.

(Continued)

*Primary Examiner* — Stephen Elmore
(74) *Attorney, Agent, or Firm* — Mohammed Kashef

(57) ABSTRACT

In one embodiment, a configuration adviser provides configuration options for a multi-tiered storage system that includes a number of different storage tiers, each of which include storage devices of a particular storage type. Data access information for storage extents to be stored in the storage system are received. Resource information for available storage tiers in the storage system to place the storage extents on are also received. A cost incurred by the storage system for placing each of the storage extents on each of the storage tiers is determined. Each storage extent is assigned to a particular one of the storage tiers that would incur the lowest cost to the storage system for storing the storage extent. For each storage tier, a minimum number of storage devices are selected, within the assigned storage tier, that would satisfy data access and capacity requirements for all storage extents assigned to that tier.

23 Claims, 6 Drawing Sheets

(56) References Cited

U.S. PATENT DOCUMENTS

2012/0102350 A1* 4/2012 Belluomini et al. .......... 713/324
2013/0097377 A1* 4/2013 Satoyama et al. ............ 711/114
2013/0151804 A1* 6/2013 Alatorre et al. ............... 711/170

OTHER PUBLICATIONS

Roland Tretau et al., "Exploring Storage Management Efficiencies and Provisioning", An IBM Redbooks Publication (Source: IBM_REDBOOKS), Aug. 2004, See Chapter 6. Advanced Provisioning, pp. 127-156.

"EMC Unified Storage—Next Generation Efficiency Details", http://virtualgeek.typepad.com/virtual_geek/2010/05/emc-unified-storage-next-generation-efficiency-details.hrtm, (retrieved on Jan. 24, 2012), pp. 1-15.

"EMC Unified: The benefit of having options", May 26, 2010, http://storagesavvy.com/tag/sub-lun/ (retrieved on Jan. 24, 2012), pp. 1-5.

* cited by examiner

MULTI-TIER STORAGE SYSTEM CONFIGURATION ADVISER

CROSS REFERENCE TO RELATED APPLICATIONS

This application is related to commonly assigned U.S. patent application Ser. No. 12/910,144 entitled "REDUCING ENERGY CONSUMPTION AND OPTIMIZING WORKLOAD AND PERFORMANCE IN MULTI-TIER STORAGE SYSTEMS USING EXTENT-LEVEL DYNAMIC TIERING," which is incorporated herein by reference in its entirety.

BACKGROUND

Embodiments of the invention relate to the field of data storage, and in particular, to providing configuration options for optimizing storage extent placement in multi-tiered storage systems.

Enterprise storage systems seek to provide performance and reliability at minimum capital and operating cost using high performance hard disk drives (HDDs). However, Solid-state drives (SSDs) offer a high random access capability per gigabyte (GB) ratio and have had reductions in cost, and therefore have become more affordable and suitable for enterprise storage. Storage systems with only SSDs are still too expensive and storage systems with only HDDs cannot provide cost-effective performance for most enterprise computing workloads.

Storage tiering is a type of storage architecture that assigns different categories of data to different types of storage media. Storage tiering aims to reduce storage costs to an IT infrastructure, while meeting performance requirements. Tiering categories are primarily based on performance requirements, frequency of use, and levels of protection needed. For example, multi-tier storage systems may contain a mix of storage device types. SSDs may be used for one of the storage tiers to provide high performance storage and specific types of HDDs at a lower cost than SSD may be used for other tiers that do not require high performance to meet customer storage requirements.

Current commercial SSD-based multi-tier systems (e.g., IBM System Storage™ Easy Tier) include multi-tier capabilities that provide performance gains and cost savings. However, customer adoption has been slow due to the difficulty to determine what mix of devices will perform well at minimum cost in the customer's data center. This determination is highly complex given the number of device types available along with the variability of workloads in the data center. Storage sales teams currently routinely over-provision enterprise storage systems' configuration based on incomplete workload information and conservative performance modeling techniques. As a result, the storage configurations may not meet customer expectations for performance and cost.

BRIEF SUMMARY

An aspect of the invention includes a method of configuring a multi-tiered storage system. The storage system comprises a plurality of storage tiers and each of the storage tiers includes storage devices of a particular type of storage. Data access information for storage extents (a small portion of a storage volume) to be stored in the storage system is received. Resource information for available storage tiers in the storage system to place the storage extents on is also received. A cost incurred by the storage system for placing each of the storage extents on each of the storage tiers is determined. The cost being is based on a consumption of storage resources for storing a storage extent in a storage tier and calculated using the data access and resource information. Each storage extent is assigned to a particular one of the storage tiers that would incur the lowest cost to the storage system for storing the storage extent. For each storage tier, a minimum number of storage devices are selected, within the assigned storage tier, that would satisfy data access and capacity requirements for all storage extents assigned to that tier.

Another aspect of the invention includes a second method of configuring a multi-tiered storage system. The storage system comprises a plurality of storage tiers and each of the storage tiers includes storage devices of a particular type of storage. Data access information for storage extents to be stored in the storage is received. Resource information for available storage tiers in the storage system to place the storage extents on is also received. A cost incurred by the storage system for placing each of the storage extents on each of the storage tiers is determined. The cost is based on a consumption of storage resources for storing a storage extent in storage tier and calculated using the data access and resource information. At least one configuration option for storing the storage extents in the storage system is generated. Each configuration option includes a range of response times correlated to, for storing each storage extent, a particular storage configuration and associated cost.

The details of the embodiments of the invention are described below in the Detailed Description section in reference to the accompanying drawings. The Summary is intended to provide a brief summary of features of the claimed subject matter and is not intended to limit the scope of the claimed subject matter.

DETAILED DESCRIPTION

Embodiments of the present invention provide configuration options for optimizing storage extent placement in multi-tiered storage systems. The present invention includes a configuration adviser that provides storage placement configuration, which ensures all data is suitably placed such that cost is minimized and a customer's performance requirements are met. For example, the configuration advisor may configure storage placement such that cost is minimized for lightly accessed data. The configuration adviser provides storage extent placement configurations that meet customers' performance requirements at a minimum capital cost and total cost of ownership.

The configuration adviser for a prospective new tiered storage system, provided with an estimate of performance requirements and a capacity goal, can advise on storage device mix for the right size storage components while meeting performance objectives. For example, the configuration adviser can provide configuration options for upgrading from a current storage system to a new tiered storage system that meets preferences for capacity and performance. In addition, the configuration adviser can provide ongoing validation checking of a current tiered storage system configuration. This allows the configuration adviser to be run periodically, after a new system has been installed or an upgrade has been performed, to measure current performance against expectations and determine whether the storage system should be further upgraded or reconfigured. Lastly, the configuration adviser can also be used to perform cost based storage analysis for an existing tiered storage system.

The configuration adviser starts by determining workload requirements for the tiered storage system to be configured. The configuration adviser then estimates resource consumption by simulating placement of each storage extent in a tier that minimizes its incurred cost while meeting its performance. This process is iteratively repeated for every epoch such that successive epochs are analyzed for assigning extents to their lowest cost tier based on their performance requirements in that epoch. In a preferred embodiment, the workload requirements are specified using a time series of access statistics, and the configuration advisor splits the time series into a set of epochs and analyzes each epoch in sequence. After analyzing all epochs, the configuration adviser combines required resources across all the time intervals, which results in minimum capital cost number of devices per tier. For example, for each tier taking the maximum number of resources required across all time intervals and resulting in a cost efficient configuration option.

Figure 1:
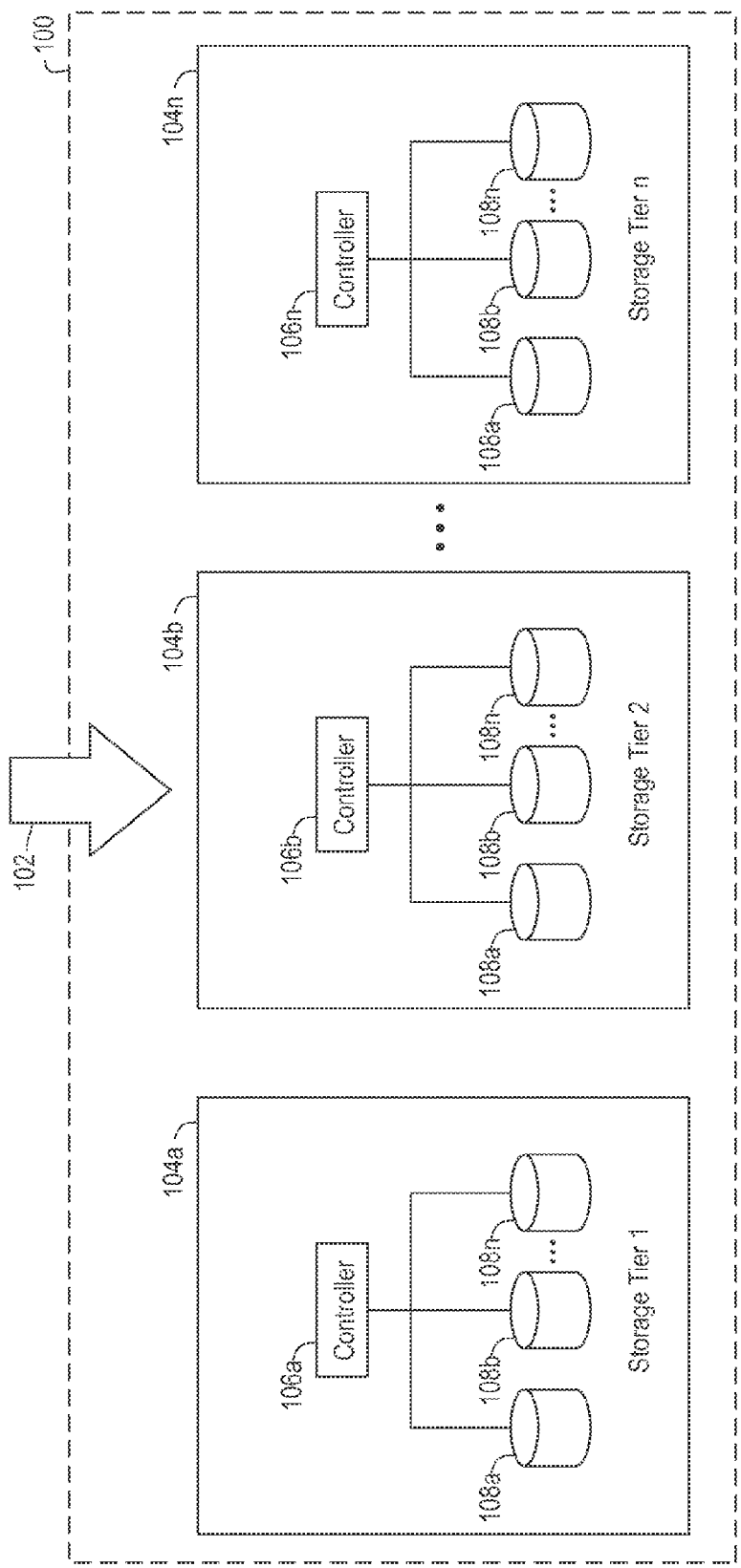
FIG. 1 is a diagram of an exemplary multi-tier storage system.

FIG. 1 is a diagram of an exemplary multi-tier storage system 100. The multi-tier storage system receives I/O requests 102 and includes a plurality of storage tiers, storage tier 1 104*a*, storage tier 2 104*b* . . . storage tier n 104*n*. Each of the storage tiers includes a storage controller 106*a*, 106*b* . . . 106*n* and a plurality of storage devices 108*a*, 108*b* . . . 108*n*. Each of the storage tiers has a single and unique type of storage based on a storage tiers' performance/cost/energy profile. The multi-tier storage system comprises different types of storage and seeks to align data's value, importance, and performance requirements with the reliability and performance of the actual storage the data resides on.

For example, a storage tier may comprise storage devices of a storage type including ATA (Advanced Technology Attachment), FC (fiber channel), SSD, SAS (Serial Attached SCSI), SATA (Serial Advanced Technology Attachment), or tape. A first storage tier with expensive high-quality media that provides fault tolerance and reliability (e.g., RAID6, SSD) may be used for mission-critical data. A second storage tier with cheaper and more conventional storage media (e.g., SATA) may be used for non-mission-critical data that is accessed infrequently. A third storage tier with high performance storage (e.g., FC) may be used for frequently accessed data. A fourth storage tier with optical storage (e.g., tape storage) may be used to backup data from another storage tier.

Figure 2:
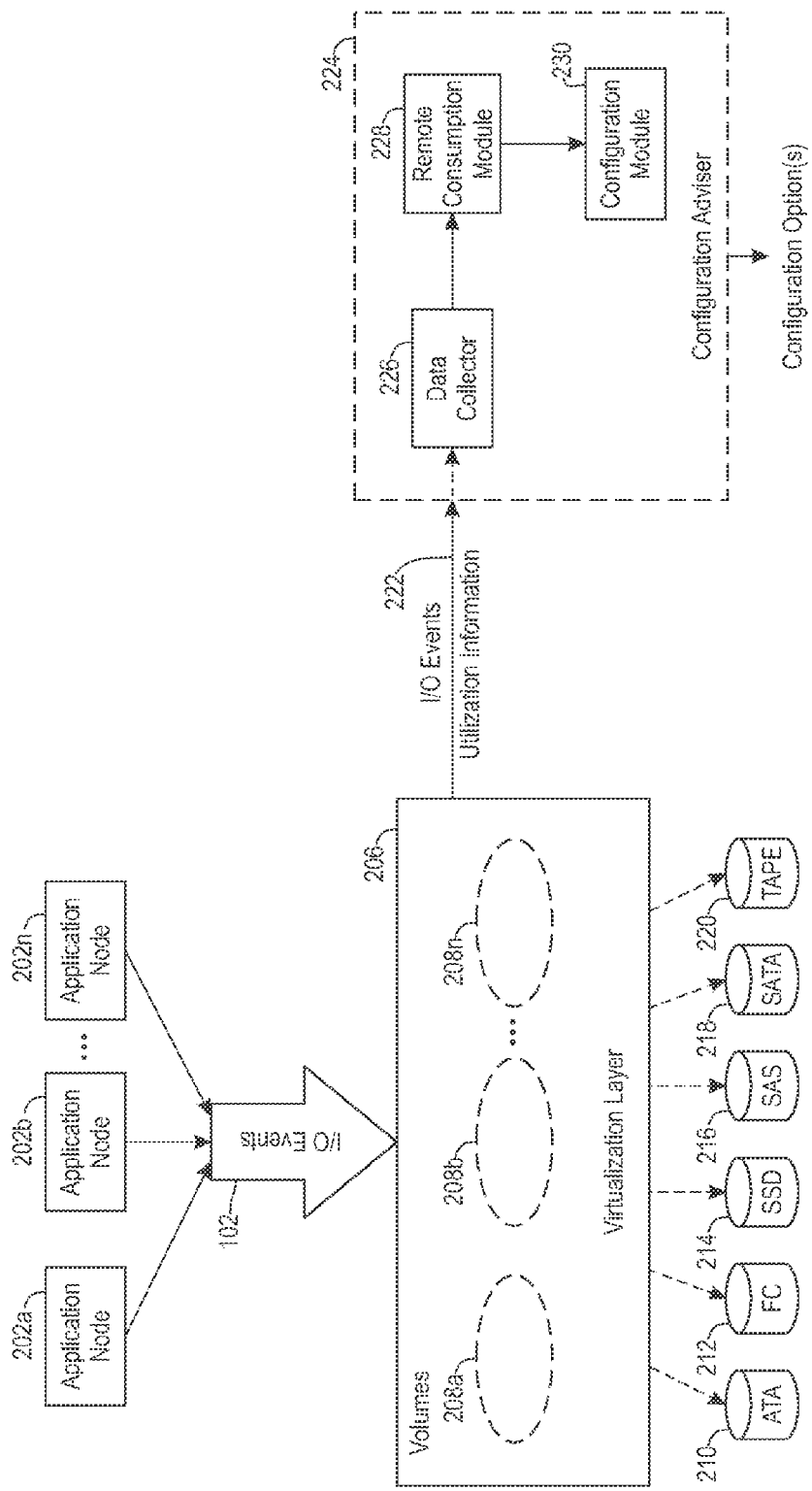
FIG. 2 is a diagram of an exemplary system for providing configuration options for optimizing storage extent placement in multi-tiered storage systems, according to one embodiment.

FIG. 2 is a diagram of an exemplary system for providing configuration options for optimizing storage extent placement in multi-tiered storage systems, according to one embodiment. A plurality of application nodes 202*a*, 202*b* . . . 202*n* send data access requests 102 (e.g., I/O requests) to a storage system 206. The storage system 206 comprises a plurality of storage tier volumes 208*a*, 208*b* . . . 208*n* with storage devices of a particular type of storage. In one embodiment, the storage system may be virtualized for shared storage with a virtualization layer that allows volumes to be made up of storage extents in different storage tiers and storage devices.

The storage system may include a plurality of different types of storage. The storage devices (e.g., storage arrays) may include ATA 210, FC 212, SSD 214, SAS 216, SATA 218, and TAPE 220. In one embodiment, the storage devices may be at the same reliability, also referred to as a redundancy level, (e.g., RAID 5), therefore migrating data across arrays is not restricted. In another embodiment, storage extent migration across different reliability levels is controlled by a policy that can enable migrating to a higher or lower RAID level.

The system further comprises a configuration adviser 224. The configuration adviser receives storage extent data access information 222 (e.g., I/O event information) from the storage system. The configuration adviser includes a data collector 226, a resource consumption module 228, and a configuration module 230. The configuration adviser outputs configuration option(s) for the storage system. The system is capable of configuring for any number of tiers and taking into account customer constraints such as a desired home tier, types of storage tiers, and tolerance for performance variability.

Figure 3:
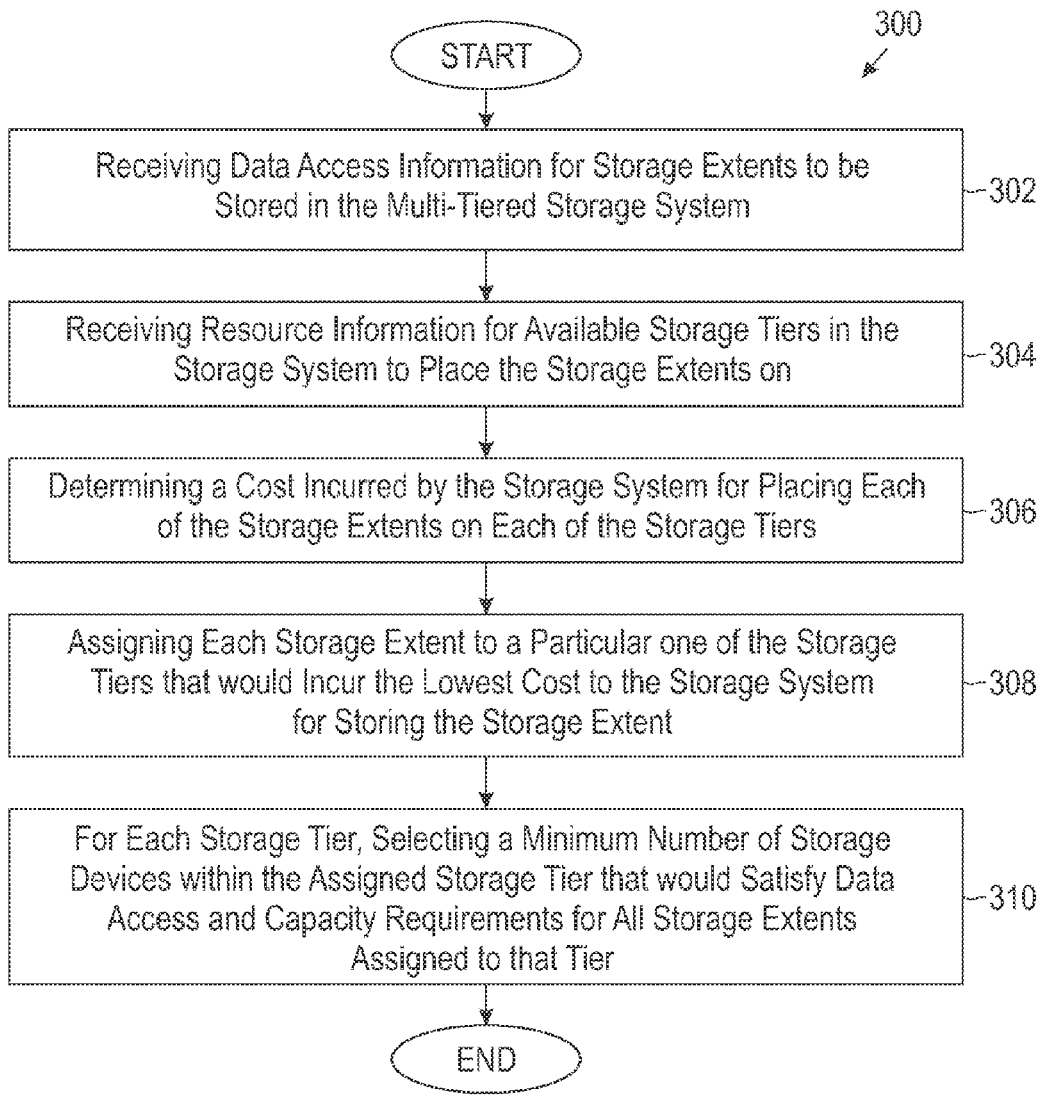
FIG. 3 is a flow chart of a first method that provides configuration options for optimizing storage extent placement in a multi-tiered storage system, according to one embodiment.

FIG. 3 is a flow chart of a first method that provides configuration options for optimizing storage extent placement in a multi-tiered storage system, according to one embodiment. In step 302, the data collector receives data access information for storage extents to be stored in the storage system. Data placement to the storage tiers and storage devices is performed at the granularity of a storage extent. The storage extents' size is variable based on preferences for the storage system's performance. For example, preferences for the storage system's performance may include migration latency, data access response speed, data placement efficiency, and metadata overhead. In an exemplary embodiment, the storage extent's size is 64 MB, but may range from tens of megabytes to small number of gigabytes based on the performance preferences and the specific storage system being provisioned.

The data collector assists with determining the workload requirements for the storage system the configuration adviser is going to configure. In one embodiment, the workload requirements are collected and inputted to the data collector using a general description of requirements including IOPS (Input/Output Operations per Second), sequential/random mix, length of I/O requests, and their distribution across extents. In another embodiment, the workload requirements are inputted into the data collector using statistics collected from an actual workload running on an existing system.

In one embodiment, the data access information consists of fine grain statistics including performance information of I/Os issued to storage extents (i.e., I/O rate in IOPS), the size of the storage extent, random I/O bandwidth (i.e., bytes transferred per second), read/write ratio, random/sequential ratio, response time, LBA (logical bus address), a currently assigned volume ID, and a currently assigned storage device array.

The data access information may be received continuously at predetermined time interval(s). The predetermined time interval selected (e.g., by a system administrator) may be system or workload specific. For example, the predetermined time interval to receive data access information for large-scale storage architectures may range from 1 minute to 24 hours, with a preferred range of 5 to 10 minutes.

In step 304, the data collector receives resource information for available storage tiers in the storage system to place the storage extents on. In one embodiment, the resource information includes preference information for the type of storage to place said storage extent on and may consist of utilization information for the preferred type of storage. The utilization information may comprise storage statistics, including total available storage space, total storage capacity, current configuration, logical block addressing (LBA) to which an I/O was issued, volume ID, and/or a read or write indicator. In another embodiment, the utilization information comprises network statistics, including I/O rate capability, I/O traffic (i.e., random I/O rate), IOPS capacity, bandwidth capability, migration overhead (data transferred, number of I/Os), and/or response times. In another exemplary embodiment, the utilization information may comprise energy statistics, including energy consumed, completed IOPS per Watt, and/or GB per Watt.

In another embodiment, the data collector receives resource information for a particular workload. The resource information for a particular workload may consist of statistics for current capacity for which the workload was collected, future capacity requirements and anticipated workload over that capacity, slack factor or utilization bound per drive/rank, and response time anticipation, and current RAID level for drives. For example, the storage system may have a firmware data path that can collect and report statistics about the workload being applied.

High IOPS regions may be placed onto SSD while leaving the remainder of the data on SAS or SATA. However, IOPS-based placement does not factor in the bandwidth requirement of an extent and an extent with high IOPS relative to other extents may not have high enough I/O density (IOPS/GB) to justify the cost from the high cost/GB of the SSD. Therefore, I/Os that are taken as part of a sequential stream contribute to an extent's bandwidth requirement. I/Os characterized as random I/Os are used to compute a random I/O rate.

In step 306, the resource consumption module determines a cost incurred by the storage system for placing each of the storage extents on each of the storage tiers. The cost being based on a consumption of storage resources for storing a storage extent in a storage tier and calculated from the data access and resource information. This cost includes capital costs and/or total cost of ownership for the storage system to serve I/O requests for a given storage extent.

The resource consumption model determines the most efficient tier for an extent. For instance, when minimizing cost, the most suitable tier is the one where the extent incurs the lowest cost (the product of the device cost and the extent's resource consumption on that device).

For example, for a storage extent E the cost of allocating a storage extent to a storage device D may be computed as: $cost(E,D)=cost(D) \cdot RC(E,D)$. $RC(E,D)$ is the overall resources estimated to be required by a storage extent and is computed as $RC(E,D)=\max(RC(E_p,D),RC(E_c,D))$. ($RC(E_c,D)$ is the amount of resource required to host a storage extent's capacity and may be computed as: $RC(E_c,D)$=Capacity required by extent/Total space in device. $RC(E_p,D)$ is the performance resource consumption of a storage extent E, when placed on storage device and is computed as: $RC(E_p,D)$=RIOR·Rtime+Bandwidth·Xtime. RIOR is defined as the random I/O rate. Rtime is defined to be the time consumed to perform a single random I/O. Rtime is estimated to be the sum of average seek time and average rotational delay of device D if D is a hard disk drive (HDD) (e.g., Rtime=data access time for a SSD). Xtime is the time required to transfer a single byte from the device D, assumed to be the inverse of the maximum bandwidth of the device D.

In step 308, the configuration module assigns each storage extent to a particular one of the storage tiers that would incur the lowest cost to the storage system for storing the storage extent. The process is iterated for all the extents and separates the extents into bins, each bin representing a particular tier.

In step 310, the configuration module, for each storage tier, selects a minimum number of storage devices within the assigned storage tier that would satisfy data access and capacity requirements for all storage extents assigned to that tier. For each storage tier, its capacity and resource consumption is obtained. For example, the performance and resource consumption can be calculated as: $RCp=\Sigma RC(Ep,D)$ $\forall E$, and $RCc=\Sigma RC(Ec,D)$ $\forall E$. The maximum of these two values gives the total bin resources required, and the number of required devices of this bin type are computed by rounding up this sum to the nearest integer value.

Figure 4:
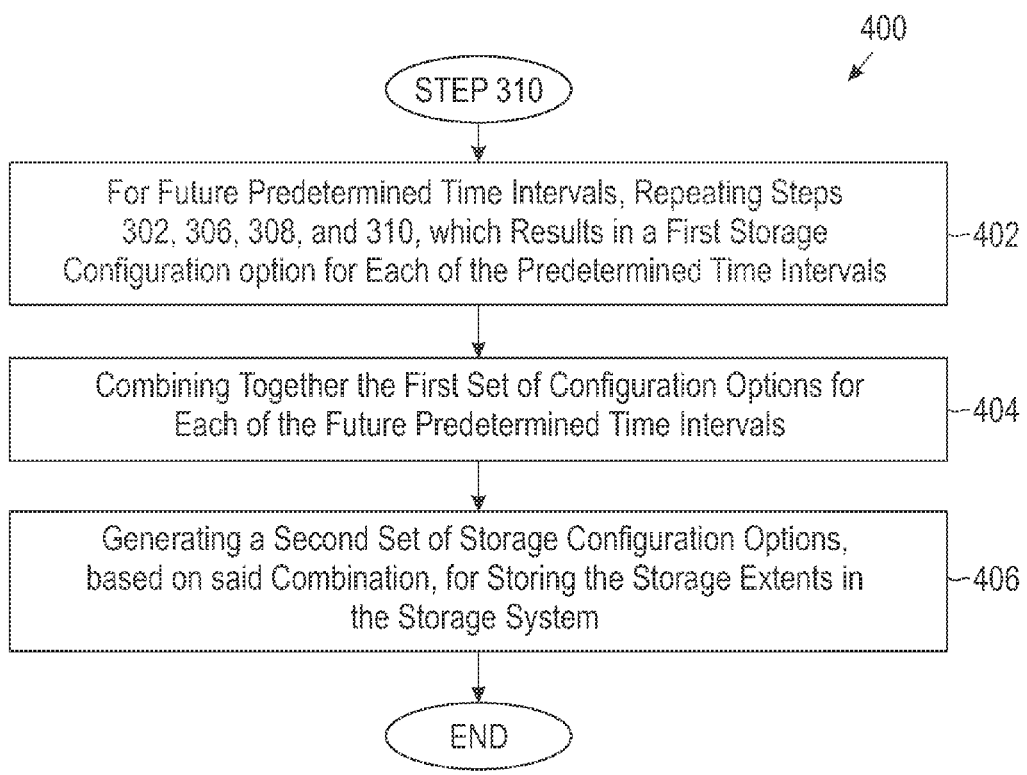
FIG. 4 is a flow chart of the first method that additionally generates a set of configuration options based on predetermined time instances, according to one embodiment.

FIG. 4 is a flow chart of the first method that additionally generates a set of configuration options based on predetermined time instances, according to one embodiment. The method 400 addresses data access variations for workloads at different points in time. The method 400 continues from step 310 of method 300. In step 402, for future predetermined time intervals, the system repeats steps 302, 306, 308, and 310, which results in a first storage configuration option for each of the predetermined time intervals. The storage configuration may include a number of storage tiers, a storage tier type, and a number of storage devices required.

In step 404 the configuration module combines together the first set of configuration options for each of the future predetermined time intervals. For example, the process described in step 402 is independently repeated for each of the predetermined time intervals. In step 404 the configuration module outputs the number of devices per tier that yields minimum cost for that that interval.

In step 406, the configuration module generates a second set of storage configuration options, based on said combination, for storing the storage extents in the storage system. The first and second set of configuration options includes a range of response times correlated to, for storing each storage extent, a particular storage configuration and associated cost. Step 406 consists of combining these different configurations over time to obtain a final system configuration valid across time. In one embodiment, the final configuration may be generated by allocating the maximum number of devices of each type used across all time instances. For example, if at time instance $t_0$ the configuration module provides that 2 devices of type D and 1 of type D' are the most cost effective, but at time $t_1$ 1 of type D and 2 of D' is better, then the configuration module will indicate that we need 2 of type D and 2 of D'. In another embodiment, the ratio of storage in each tier can be projected into the future for increased capacity and performance requirements.

A matrix of configuration choices will be outputted for the first and second set of configuration options. In one embodiment, the output of configuration options will consist of 7 choices based on the admissible tiers. The seven choices include all SAS, all SATA, all SSD, SAS+SSD, SAS+SATA, SSD+SATA, and SSD+SAS+SATA. If the storage system comprises multiple vendor types of storage devices that cause the drive characteristics to differ are available, each of the seven choices may be suitably expanded to vary the device vendor.

For each configuration choice, the output will consist of a range of response times, and for each response time, it will optionally include number of devices of each type and cost. The overall goal of the configuration will be to find the minimum cost configuration that meets the given response time objective. In one embodiment, the placement may ensure that actively accessed data is placed to minimize latency while lightly accessed data is placed most economically. For example, the configuration adviser can start with a minimum cost configuration that meets the storage system's demands and compute an average response time for that configuration. The configuration adviser can then compute configurations that improve the response time by a 6% each time.

Figure 5:
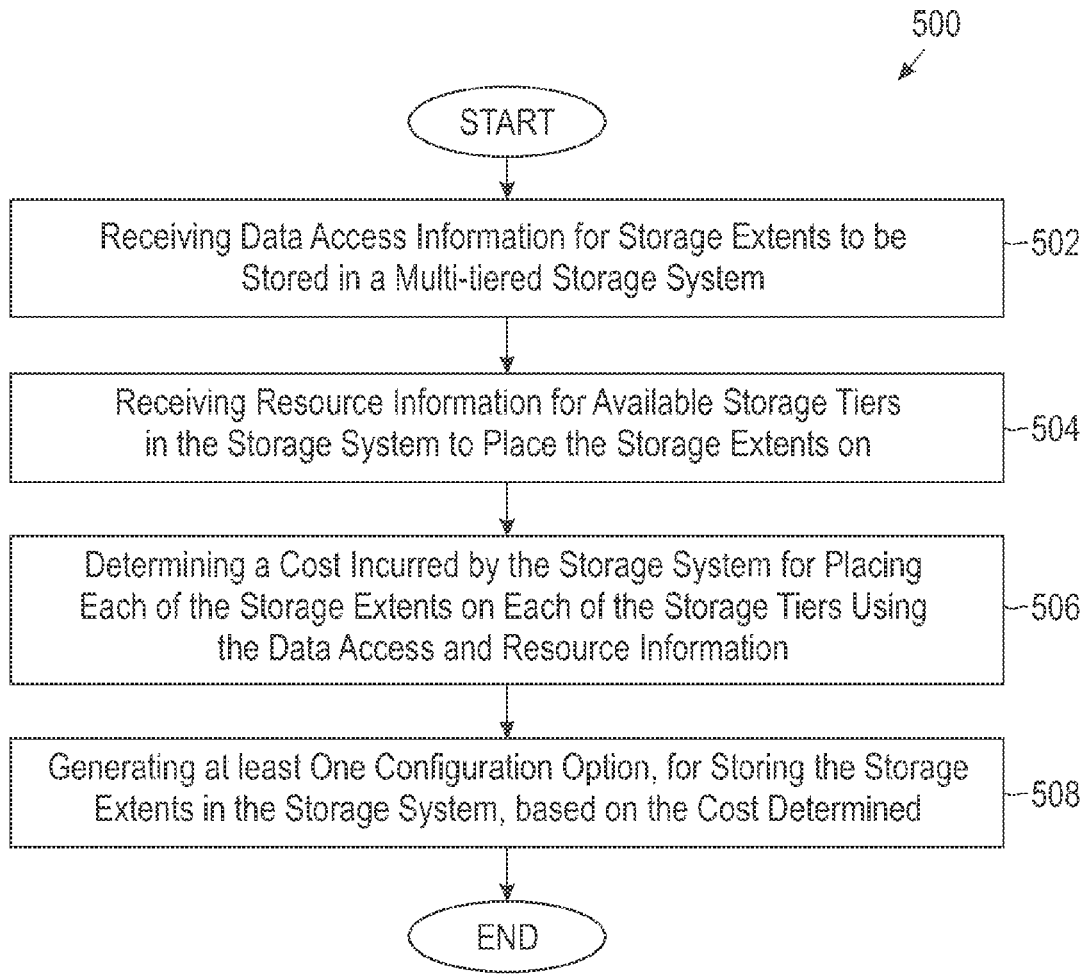
FIG. 5 is a flow chart of a second method for providing configuration options for optimizing storage extent placement in a multi-tiered storage system, according to one embodiment.

FIG. 5 is a flow chart of a second method for providing configuration options for optimizing storage extent placement in a multi-tiered storage system, according to one embodiment. In step 502, the data collector receives data access information for storage extents to be stored in the storage system. In step 504, the data collector receives resource information for available storage tiers in the storage system to place the storage extents on. In step 506, the resource consumption module determines a cost incurred by the storage system for placing each of the storage extents on each of the storage tiers. The cost being based on a consumption of storage resources for storing a storage extent in a storage tier and calculated from the data access and resource information.

In step 508, the configuration module generates at least one configuration option for storing the storage extents in the storage system based on the cost calculated in step 506. In one embodiment, each option includes a range of response times correlated to, for storing each storage extent, a particular storage configuration and associated cost. The particular storage configuration may include a number of storage tiers, a storage tier type, and a number of storage devices required in the storage tier(s). The at least one configuration option may be generated by the configuration module assigning each storage extent to a particular one of the storage tiers that would incur the lowest cost to the storage system for storing the storage extent and separates the extents into bins, each of which represents a particular tier. The configuration module then, for each storage tier, selects a minimum number of storage devices within the assigned storage tier that would satisfy data access and capacity requirements for all storage extents assigned to that tier. Capacity and resource consumption calculation is described supra.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
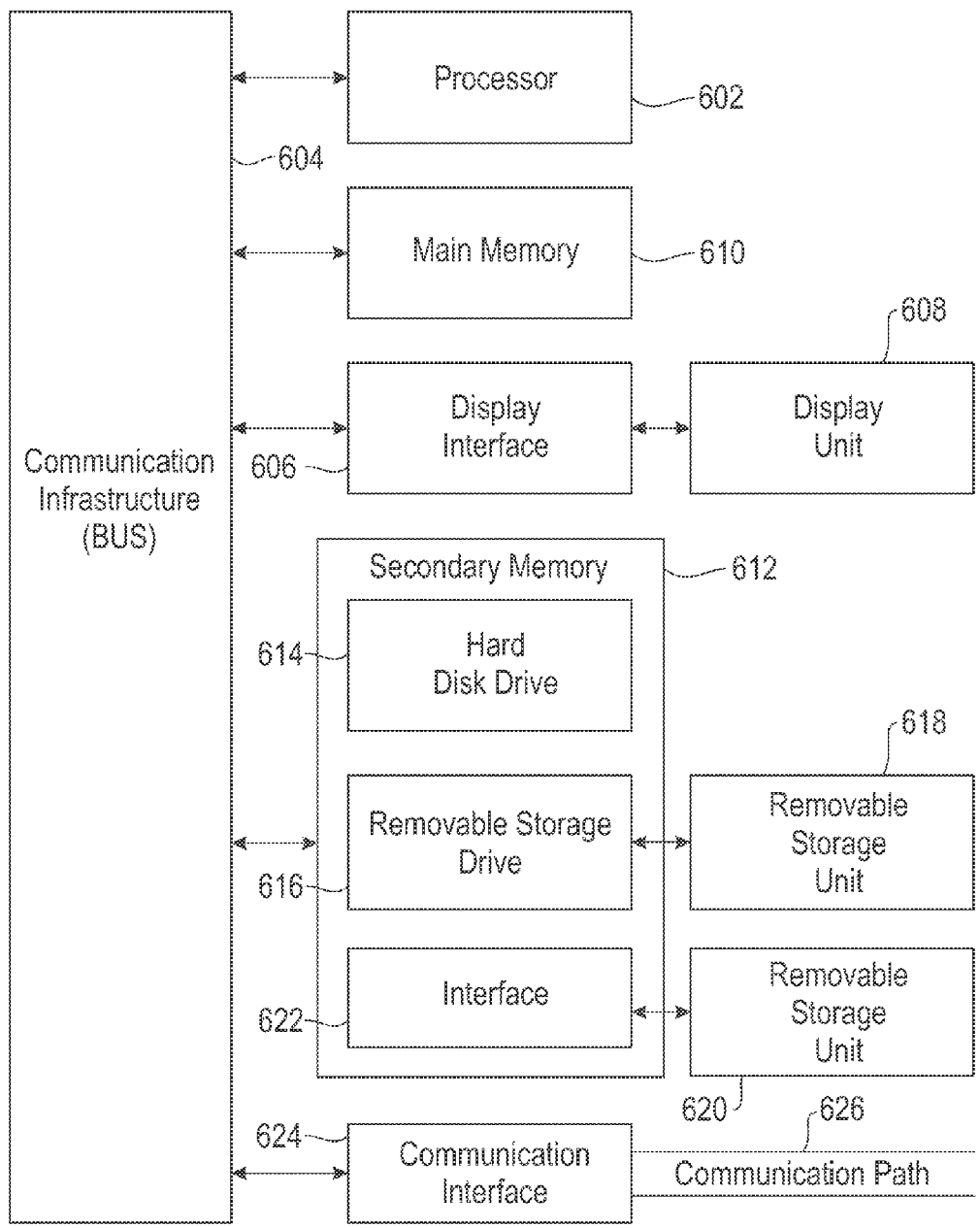
FIG. 6 is a high level block diagram showing an information processing system for implementing an embodiment of the present invention.

FIG. 6 is a diagram of a system for implementing an embodiment of the invention. The computer system includes one or more processors, such as a processor 602. The processor 602 is connected to a communication infrastructure 606 (e.g., a communications bus, cross-over bar, or network).

The computer system can include a display interface 606 that forwards graphics, text, and other data from the communication infrastructure 606 (or from a frame buffer not shown) for display on a display unit 608. The computer system also includes a main memory 610, preferably random access memory (RAM), and may also include a secondary memory 612. The secondary memory 612 may include, for example, a hard disk drive 616 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc., which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 620 and an interface 622. Examples of such means may include a program package and package interface (such as that found in video game devices), a removable memory chip (such as an EPROM, or PROM) and associated socket, and other removable storage units 620 and interfaces 622 which allow software and data to be transferred from the removable storage unit 620 to the computer system.

The computer system may also include a communications interface 626. Communications interface 626 allows software and data to be transferred between the computer system and external devices. Examples of communications interface 626 may include a modem, a network interface (such as an Ethernet card), a communications port, or a PCMCIA slot and card, etc. Software and data transferred via communications interface 626 are in the form of signals which may be, for example, electronic, electromagnetic, optical, or other signals capable of being received by communications interface 626. These signals are provided to communications interface 626 via a communications path (i.e., channel) 626. This communications path 626 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 610 and secondary memory 612, removable storage drive 616, and a hard disk installed in hard disk drive 616.

Computer programs (also called computer control logic) are stored in main memory 610 and/or secondary memory 612. Computer programs may also be received via a communication interface 626. Such computer programs, when run, enable the computer system to perform the features of the present invention as discussed herein. In particular, the computer programs, when run, enable the processor 602 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that, although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A method of configuring a multi-tiered storage system, the storage system comprises a plurality of storage tiers and each of the storage tiers includes storage devices of a particular type of storage, the method comprising:
   receiving, by the storage system, data access information for storage extents to be stored in the storage system;
   receiving, by the storage system, resource information for available storage tiers in the storage system to place the storage extents on;
   determining, by the storage system, a cost incurred by the storage system for placing each of the storage extents on each of the storage tiers, the cost being based on a consumption of storage resources for storing a storage extent in a storage tier and calculated from the data access and resource information;
   assigning, by the storage system, each storage extent to a particular one of the storage tiers, said one of the storage tiers would incur the lowest cost to the storage system for storing the storage extent; and
   for each storage tier, the storage system selecting a minimum number of storage devices within the assigned storage tier that would satisfy data access and capacity requirements for all storage extents assigned to that tier.

2. The method of claim 1, further comprising:
for each of a plurality of future predetermined time intervals, repeating:
said receiving data access information,
said determining a cost incurred by the storage system for placing each of the storage extents on each of the storage tiers,
said assigning each storage extent to a particular one of the storage tiers, and
for each storage tier, said selecting a minimum number of storage devices within the assigned storage tier that would satisfy the data access and capacity requirements; and
wherein the repeating results in a first configuration option for each of the predetermined time intervals.

3. The method of claim 2, further comprising:
combining, by the storage system, together the first set of configuration options for each of the future predetermined time intervals;
generating, by the storage system, a second set of configuration options, based on said combination, for storing the storage extents in the storage system; and
wherein the first and/or second set of configuration options includes a range of response times correlated to, for storing each storage extent, a particular storage configuration and associated cost.

4. The method of claim 3, wherein the particular storage configuration includes information selected from the group consisting of: a number of storage tiers, a storage tier type, and a number of storage devices required.

5. The method of claim 1, wherein the data access information is selected from the group consisting of: (i) TOPS (Input/Output Operations Per Second), (ii) read/write ratio, (iii) random/sequential ratio (iv) response time, (v) LBA (logical bus address), (vi) volume ID, and (vii) array.

6. The method of claim 1, wherein the data access information includes statistics from a storage system that is currently storing the storage extents.

7. The method of claim 1, wherein said cost is selected from the group consisting of: capital cost and total cost of ownership.

8. The method of claim 1, wherein the storage devices include storage disk arrays.

9. The method of claim 1, wherein the resource information includes preference information for the type of storage to place said storage extent on.

10. A non-transitory computer-useable storage medium for configuring a multi-tiered storage system, the storage system comprising a plurality of storage tiers and each of the storage tiers includes storage devices of a particular type of storage, the computer-useable storage medium having a computer-readable program, wherein the program upon being processed on a computer causes the computer to implement the steps of:
receiving data access information for storage extents to be stored in the storage system;
receiving resource information for available storage tiers in the storage system to place the storage extents on;
determining a cost incurred by the storage system for placing each of the storage extents on each of the storage tiers, the cost being based on a consumption of storage resources for storing a storage extent in a storage tier and calculated from the data access and resource information;
assigning each storage extent to a particular one of the storage tiers, said one of the storage tiers would incur the lowest cost to the storage system for storing the storage extent; and
for each storage tier, selecting a minimum number of storage devices within the assigned storage tier that would satisfy data access and capacity requirements for all storage extents assigned to that tier.

11. The computer-useable storage medium of claim 10, further comprising the step of:
for each of a plurality of future predetermined time intervals, repeating:
said receiving data access information,
said determining a cost incurred by the storage system for placing each of the storage extents on each of the storage tiers,
said assigning each storage extent to a particular one of the storage tiers, and
for each storage tier, said selecting a minimum number of storage devices within the assigned storage tier that would satisfy the data access and capacity requirements; and
wherein the repeating results in a first configuration option for each of the predetermined time intervals.

12. The computer-useable storage medium of claim 11, further comprising the steps of:
combining together the first set of configuration options for each of the future predetermined time intervals;
generating a second set of configuration options, based on said combination, for storing the storage extents in the storage system; and
wherein the first and/or second set of configuration options includes a range of response times correlated to, for storing each storage extent, a particular storage configuration and associated cost.

13. The computer-useable storage medium of claim 12, wherein the particular storage configuration includes information selected from the group consisting of: a number of storage tiers, a storage tier type, and a number of storage devices required.

14. The computer-useable storage medium of claim 10, wherein the data access information is selected from the group consisting of: (i) TOPS (Input/Output Operations Per Second), (ii) read/write ratio, (iii) random/sequential ratio (iv) response time, (v) LBA (logical bus address), (vi) volume ID, and (vii) array.

15. A multi-tiered storage system, comprising:
a plurality of storage tiers, each of the storage tiers includes storage devices of a particular type of storage;
a memory having computer readable program instructions; and
a processor for executing the computer readable program instructions, the instructions including:
receiving data access information for storage extents to be stored in the storage system,
receiving resource information for available storage tiers in the storage system to place the storage extents on,
determining a cost incurred by the storage system for placing each of the storage extents on each of the storage tiers, the cost being based on a consumption of storage resources for storing a storage extent in a storage tier and calculated from the data access and resource information, assigning each storage extent to a particular one of the storage tiers, said one of the storage tiers would incur the lowest cost to the storage system for storing the storage extent, and for each storage tier, selecting a minimum number of storage devices within the assigned storage tier that would satisfy data access and capacity requirements for all storage extents assigned to that tier.

16. The system of claim 15, the instructions further including:

for each of a plurality of future predetermined time intervals, repeating:

said receiving data access information, said determining a cost incurred by the storage system for placing each of the storage extents on each of the storage tiers, said assigning each storage extent to a particular one of the storage tiers, and for each storage tier, said selecting a minimum number of storage devices within the assigned storage tier that would satisfy the data access and capacity requirements; and wherein the repeating results in a first configuration option for each of the predetermined time intervals.

17. The system of claim 16, the instructions further including:

combining together the first set of configuration options for each of the future predetermined time intervals;

generating a second set of configuration options, based on said combination, for storing the storage extents in the storage system; and wherein the first and/or second set of configuration options includes a range of response times correlated to, for storing each storage extent, a particular storage configuration and associated cost.

18. The system of claim 17, wherein the particular storage configuration includes information selected from the group consisting of: a number of storage tiers, a storage tier type, and a number of storage devices required.

19. The system of claim 15, wherein the data access information is selected from the group consisting of: (i) TOPS (Input/Output Operations Per Second), (ii) read/write ratio, (iii) random/sequential ratio (iv) response time, (v) LBA (logical bus address), (vi) volume ID, and (vii) array.

20. The system of claim 15, wherein the data access information includes statistics from a storage system that is currently storing the storage extents.

21. The system of claim 15, wherein said cost is selected from the group consisting of: capital cost and total cost of ownership.

22. The system of claim 15, wherein the storage devices include storage disk arrays.

23. The system of claim 15, wherein the resource information includes preference information for the type of storage to place said storage extent on.

* * * * *